W. F. DAWSON.
SPEED GOVERNOR.
APPLICATION FILED SEPT. 3, 1914.

1,213,847.

Patented Jan. 30, 1917.

Witnesses:

Inventor,
William F. Dawson,
by
Att'y.

UNITED STATES PATENT OFFICE.

WILLIAM F. DAWSON, OF LYNN, MASSACHUSETTS, ASSIGNOR TO GENERAL ELECTRIC COMPANY, A CORPORATION OF NEW YORK.

SPEED-GOVERNOR.

1,213,847.

Specification of Letters Patent.

Patented Jan. 30, 1917.

Application filed September 3, 1914. Serial No. 860,011.

*To all whom it may concern:*

Be it known that I, WILLIAM F. DAWSON, a citizen of the United States, residing at Lynn, county of Essex, State of Massachusetts, have invented certain new and useful Improvements in Speed-Governors, of which the following is a specification.

This invention relates to speed responsive devices such as are used for regulating the speed of prime movers, and its object is to provide a compact instrument capable of rotation at high speed, and nearly isochronous in its action.

For a consideration of what I believe to be novel and my invention, attention is directed to the accompanying specification and the claims appended thereto.

Figure 1:
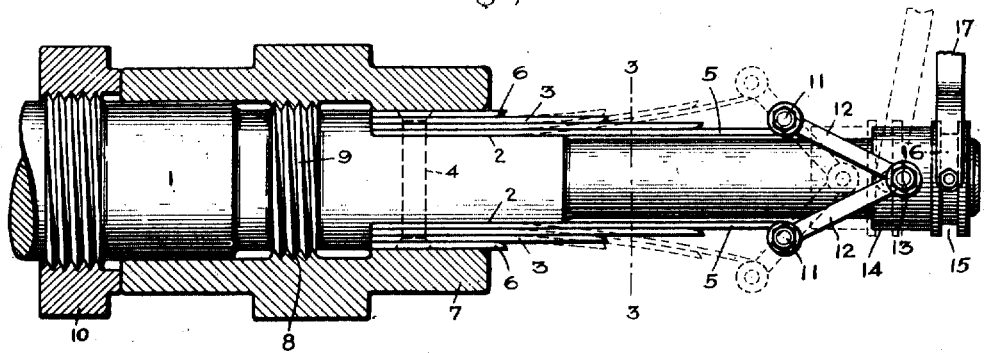
Figure 2:
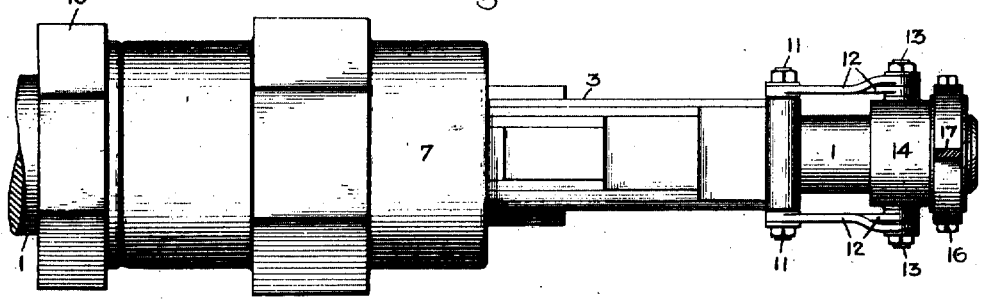
Figure 3:
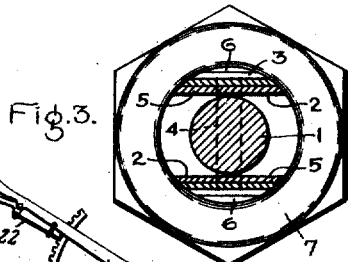
Figure 4:
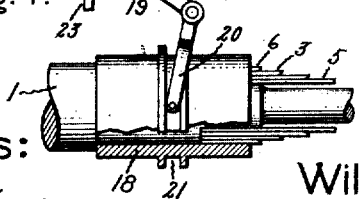

In the accompanying drawing, Figure 1 is a side elevation, partly in section of a governor embodying my invention; Fig. 2 is a top plan view; Fig. 3 is a cross-section on the line 3—3, Fig. 1; and Fig. 4 shows a modification.

The spindle 1 may be either affixed to or made integral with a rotating shaft driven by the turbine or other machine whose speed is to be governed, or it can be geared to said rotating shaft. The spindle is flattened, preferably on only two sides at 2, to form cheeks to which are secured the base ends of laminated springs 3, preferably by means of a rivet 4 passing through the springs and the spindle. Each spring may be composed of one or more leaves and if more than one they are laid one upon another. Said leaves may be all of the same length or graduated as shown. In the case illustrated, the inner one 5 is the longest and the outer one 6 the shortest, and their width also diminishes, because after being laid up they are turned to a cylindrical shape, concentric with the spindle, as shown in Fig. 2. This is for the purpose of receiving a cylindrical sleeve 7 which can be slid back and forth over the bases of the springs to lengthen or shorten their effective length. The sleeve is made adjustable preferably by means of internal screw-threads 8 engaging with a screw-threaded collar 9 on the spindle. A lock-nut 10 on the spindle holds the sleeve in any position to which it may be adjusted. Pivotally attached to pins 11 at the free ends of the inner long leaves 5 of the springs are links 12 which form toggles whose joints are pivoted to trunnions 13 on a collar 14. The latter slides freely on the spindle and has a groove 15 with which engages the fork 16 of a lever 17 connected to the controller of the machine. When the spindle is rotated, the pins 11 and the ends of the links 12 pivoted to the leaves 5 act as centrifugal weights and tend to fly outward. This tendency is aided by the weight of the free ends of the spring, but is yieldingly opposed by the elasticity of said springs. By this arrangement it will be seen that I do not employ any extra weights for my governor but utilize the springs themselves, together with the connections between the springs and the links 12 to perform this function. This is of substantial advantage as it simplifies the structure and at the same time tends to give a more nearly isochronous action.

If it is desired to change the stiffness of the springs and consequently the increment of speed required to flex them, the sleeve 7 can be adjusted lengthwise along the spindle. This governor is particularly serviceable on small industrial steam turbines, where it is frequently desirable to adjust the governor while running. Any suitable means may be used for this purpose, such, for instance, as that shown in Fig. 4. Here the sleeve 18 made smooth internally so as to have a sliding fit over the springs, and externally it is connected with some manually operated adjusting means, such as an actuating lever 19, having a fork 20 engaging a groove 21 in the sleeve. A latch 22 and quadrant 23, or any other locking device may be used to hold the lever and sleeve in any position to which they are moved, and this movement can be effected without stopping the turbine.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A centrifugal speed governor comprising a spindle, springs secured at one end to opposite sides of said spindle and extending parallel to it, a controlling device, and means connecting it to the free ends of the springs, said springs and the connecting means acting as the weights for the governor.

2. A centrifugal speed governor comprising a spindle, springs secured at one end to opposite sides of said spindle and extending parallel to it, a controlling device, means connecting it to the free ends of the springs, said springs and the connecting means acting as the weights for the governor, and means on the spindle for adjusting the effective length of the springs.

3. A centrifugal speed governor comprising a spindle having flattened sides, laminated springs having their bases secured to said sides and their free ends lying parallel to and extending along the spindle, the laminations being graduated in length with the longest ones lying next the spindle, links pivoted to the free ends of said longest laminations, a controlling device, and means connecting the links to it, said springs and the links acting as the weights for the governor.

4. A centrifugal speed governor comprising a spindle having flattened sides, laminated springs having their bases secured to said sides and their free ends lying parallel to and extending along the spindle, the laminations being graduated in length with the longest ones lying next the spindle, links pivoted to the free ends of said longest laminations, a controlling device, means connecting the link to it, and means on the spindle for adjusting the effective length of the springs.

5. A centrifugal speed governor comprising a cylindrical spindle flattened on opposite sides, laminated springs secured to said sides and having their edges concentric with said spindle, and a cylindrical sleeve sliding longitudinally on said spindle and springs.

6. A centrifugal speed governor, comprising a cylindrical spindle flattened on opposite sides, laminated springs secured to said sides and having their edges concentric with said spindle, a cylindrical sleeve sliding longitudinally on said spindle and springs, means for adjusting said sleeve, and means for locking it.

In witness whereof I have hereunto set my hand this 31st day of August, 1914.

WILLIAM F. DAWSON.

Witnesses:
 HENRY F. FRENCH,
 JOHN A. MCMANUS, Jr.